United States Patent [19]

Suggs et al.

[11] 4,229,488

[45] Oct. 21, 1980

[54] PASTA CONDITIONER

[75] Inventors: James L. Suggs, Greeneville; Dan F. Buck, Kingsport, both of Tenn.

[73] Assignee: Eastman Kodak Company, Rochester, N.Y.

[21] Appl. No.: 30,669

[22] Filed: Apr. 16, 1979

Related U.S. Application Data

[63] Continuation of Ser. No. 939,301, Sep. 5, 1978, abandoned.

[51] Int. Cl.² .......................... A23L 1/16; A23L 1/216
[52] U.S. Cl. ................................... 426/557; 426/637; 426/653; 426/654
[58] Field of Search ............... 426/557, 654, 653, 604, 426/24, 637; 260/410.7; 252/351, 353, 356

[56] References Cited

U.S. PATENT DOCUMENTS

| | | | |
|---|---|---|---|
| 3,113,869 | 10/1963 | Lee | 426/557 |
| 3,388,999 | 6/1968 | Kuhrt | 426/653 |
| 3,443,965 | 5/1969 | Birnbaum | 426/654 |

FOREIGN PATENT DOCUMENTS

| | | | |
|---|---|---|---|
| 2067391 | 8/1971 | France | 426/549 |
| 447400 | 10/1974 | U.S.S.R. | 260/410.7 |

OTHER PUBLICATIONS

Doerfort, "Distilled Monoglycerides", Reprinted from Food Engineering, Nov. 1962, Rochester, N.Y.

*Primary Examiner*—Jeanette M. Hunter
*Attorney, Agent, or Firm*—John F. Stevens; Daniel B. Reece, III

[57] ABSTRACT

Composition adapted for use as a starch complexing additive in potatoes and alimentary pasta products is described. The composition comprises a blend of about 25 to about 95% saturated monoglycerides prepared from vegetable oil and about 75 to 5% unsaturated monoglycerides prepared from vegetable oil. The composition is readily dispersible in the food product and overcomes problems such as stickiness in the cooked food.

16 Claims, No Drawings

PASTA CONDITIONER

This application is a continuation of Application Ser. No. 939,301 filed Sept. 5, 1978 now abandoned.

BACKGROUND OF THE INVENTION

Field of the Invention

This invention relates generally to foods, and more particularly, this invention relates to alimentary pasta and potato products.

Alimentary pasta products, such as, for example, spaghetti, macaroni, noodles and various other specialty items, are well known articles of commerce. They are prepared by forming a pasta of flour and water, sometimes with eggs (as in noodles), extruding the pasta or dough under very high pressure into the desired product shape and then carefully drying under controlled humidity conditions. Generally the flour used in forming the pasta is a high quality, milled, durum wheat known as semolina. Occasionally the flour may also comprise less costly farina. The invention is also useful in potato products.

SUMMARY OF THE INVENTION

In accordance with this invention, a pasta or potato additive or conditioner is provided which comprises a wettable powder comprising monoglycerides of both saturated vegetable oil and unsaturated vegetable oil. This additive, sometimes referred to in the art as a starch complexing agent, is readily dispersible in pasta products and potatoes, and overcomes the problems of stickiness, pastiness and sliminess when no such additives are used. The starch complexing agent prevents these undesirable properties by inhibiting the starch from swelling and absorbing water.

DESCRIPTION OF THE PRIOR ART

U.S. Pat. No. 3,113,869 relates to alimentary pasta products and process for preparing same in which a chemically saturated monoglyceride is used in the flour to overcome the problems of stickiness when such products are prepared for use. Without the use of such an additive in spaghetti, for example, the spaghetti would become pasty, sticky or slimy after being cooked in boiling water. Normally, the saturated monoglycerides disclosed in this patent are added to the pasta when the product is formed, such as by extrusion. A problem has been encountered, however, in that the saturated monoglyceride does not disperse well in the product. Often, streaks of the monoglyceride along the length of the product will form because of the poor dispersion characteristics of the saturated monoglyceride. It has surprisingly been found that when the additive contains at least a small amount of unsaturated monoester with the saturated monoester, it is readily dispersible in the product, thereby overcoming the problems of dispersibility of the saturated monoglyceride. The additive will herein sometimes be characterized as a solid solution, which is conveniently prepared by melt blending the unsaturated and saturated monoglycerides. By the term solid solution, we mean a homogeneous crystalline material containing the monoglycerides in variable proportion.

U.S. Pat. No. 3,369,907 relates to the use of a blend of a low iodine value monoglyceride and a lower monocarboxylic acid ester of a polyhydric alcohol in the preparation of yeast-raised baked products. The blend is in the form of a soft pasta or plastic. U.S. Pat. No. 3,388,999 relates to the use of a mixture of a saturated monoglyceride, an unsaturated monoglyceride, water, lecithin, and a triglyceride in bakery products. U.S. Pat. No. 3,379,535 relates to the use of a plastic microdispersion of highly saturated monoglyceride in water as a food additive, including starch complexing agent. The microdispersion is said to be a plastic of the consistency of hydrogenated vegetable oil, shortening or lard. In contrast, the present invention provides an additive which is used in free-flowing powder form and is a blend of saturated and unsaturated monoglycerides, or a partially hydrogenated monoglyceride, which is readily wettable which aids in dispersibility, has the ability to complex starch, and can be powdered.

Applicants' copending application Ser. No. 974,286, filed Dec. 29, 1978, relates to powdered, wettable monoglycerides useful additives in bakery products.

DETAILED DESCRIPTION OF THE INVENTION

The conditioning additive according to this invention comprises from about 25 to about 95% distilled monoglycerides prepared from saturated vegetable oil and from about 75 to about 5% distilled monoglycerides prepared from unsaturated vegetable oil. The resulting conditioning additive has an iodine value of between about 5 and about 35, a melting point of above about 50° C. and is capable of forming a dry, free-flowing powder which is sufficiently wettable to form a particulate dispersion in water at 25° C. Preferably, the iodine value is between about 20 and 35, and the wettability value, as described hereinafter, is between 0 and 40. The percentages are by weight, based on the total weight of the saturated and unsaturated monoglyceride.

At least about 5% of unsaturated monoglyceride must be present to obtain adequate dispersibility, i.e., a wettability value as defined hereinafter of between 0° and about 80°. Up to about 75% of unsaturated monoglyceride may be present without any significant decrease in conditioning properties (stickiness, pastiness, or sliminess).

The monoglycerides of the composition according to the present invention may be represented structurally as follows:

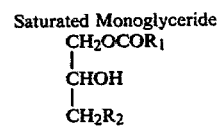

Saturated Monoglyceride wherein $R_1$ is the residue of a straight chain saturated fatty acid having from 8 to 22 carbon atoms and $R_2$ is OH or H.

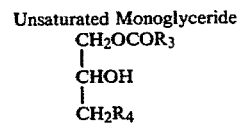

Unsaturated Monoglyceride wherein $R_3$ is the residue of a straight chain unsaturated fatty acid having from 8 to 22 carbon atoms and $R_4$ is OH or H.

The solid solution preferably contains at least about 80–90% of the above compounds. As a practical matter, however, diglycerides, triglycerides, unreacted material, etc., may be found in the composition. The term "monoglyceride" is used herein for convenience, even though such other materials are present therein.

Although compositions containing as little as about 40% of the mono-esters are somewhat effective, much better results are obtained with higher purity compositions.

The monoester products of this invention are made in accordance with well-known procedures. One conventional procedure is the direct esterification of one or more vegetable oils containing the fatty acids with glycerol followed preferably by distillation to obtain a high purity product containing one or more monoester.

The fatty acids from vegetable oils used to esterify glycerol exist naturally in the cis configuration. Hydrogenation of these fatty acids, or hydrogenation of the monoglycerides from which they are made, causes a change from the cis unsaturated fatty acid ester to the trans form. Unexpectedly, it has been discovered that the cis form of acid ester in the monoglyceride is highly desirable because it results in the monoglyceride wetting much faster than when the acid ester in the trans form. Thus it is preferred that natural oils or fats containing the acids with the desired degree of unsaturation be used rather than partially hydrogenating such acids. For example, the oils from cottonseed, soybean, palm, tallow, lard, etc., contain acid esters in the cis form. When partially hydrogenated, however, the acid esters change to the trans form and the resulting monoglyceride wets at a much slower rate. Needless to say, the products which wet faster are more desirable. Thus, to obtain the required degree of unsaturation or iodine value of the monoglyceride, it is highly desirable to use a monoglyceride, the acid ester of which is in the natural cis form, to the greatest ester possible.

Other procedures for the preparation of distilled, high purity monoglyceride products are disclosed in U.S. Pat. Nos. 2,634,234, 2,634,278 and 2,634,279 to Kuhrt. Such distilled monoesters products usually contain monoesters at a concentration of at least about 90% by weight. Although the preferred manner of preparing the product is by esterifying the glycol and vegetable oils separately, followed by melt blending, the esterification can be carried out simultaneously using a mixture of saturated and unsaturated vegetable oils in the above-described proportions. Such procedures are well known in the art.

The preferred saturated monoglyceride is prepared from saturated soybean oil, but palm oil, cottonseed oil, peanut oil, sesame oil and the like, which have been substantially fully hydrogenated, may be used. Commercially available saturated monoesters include Myverol 18-00, 18-04, 18-06 and 18-07 distilled monoglycerides, products of Eastman Chemical Products, Inc.

A preferred unsaturated monoester is a distilled monoester product made from cottonseed oil. Other useful unsaturated monoesters include the distilled monoester made from palm oil, soybean oil, peanut oil, corn oil, sesame seed oil and the like. Commercially available unsaturated monoglycerides include Myverol 18-30, 18-35, 18-40, 18-50K, 18-85 and 18-98 distilled monoglycerides, products of Eastman Chemical Products, Inc.

The terms "saturated" and "unsaturated" are used herein to define monoglyceride components of the composition described and claimed. By "saturated" monoglyceride, or monoglyceride prepared from "saturated" vegetable oil, we mean a monoglyceride prepared from a vegetable oil which has been substantially fully hydrogenated, i.e., to an iodine value of less than about 5, and preferably less than about 1. Vegetable oils exist naturally in an unsaturated state, and depending upon the content of particular fatty acids, may have an iodine value of between about 25 and about 140.

By the term "unsaturated", or monoglyceride prepared from "unsaturated" vegetable oil, we mean a monoglyceride prepared from vegetable oil which has not been subjected to hydrogenation, but which naturally is unsaturated. Typical vegetable oils include cottonseed oil, soybean oil, peanut oil, palm oil, sesame oil and the like.

The composition of the present invention is herein often referred to as a blend of saturated and unsaturated monoglycerides. It should be understood, however, that at the present time we consider physically melt blending with subsequent cooling and powdering to be the preferred procedure for producing our compositions, direct esterification of a blend of saturated and unsaturated vegetable oil in the proportions stated is possible.

Preservatives such as antioxidants (for example, propyl gallate, butylated hydroxy toluene, butylated hydroxy anisole and the like) and metal complexing agents (for example, glycine, phosphoric acid and the like) are preferably employed. Concentrations are conventional, generally being less than 1% by weight of the monoglycerides.

The powder according to this invention may be prepared by melt blending the ingredients until a homogeneous mass is obtained and then forming a powder from the mass. Melt blending may be accomplished by individually maintaining or raising the temperatures of the compounds to a point above their respective melting temperatures so each is a molten mass and then thoroughly blending, or by mixing the ingredients at room temperature and then raising the temperature of the mixture at least to the melting point of the highest-to-melt ingredient followed by thoroughly blending to form a homogeneous mass. Preferably, melt blending is accomplished at a temperature of between about 80° C. and 120° C. Powdering may be accomplished by conventional means such as, for example, spray chilling, freezing and pulverizing, or by any other means known in the art. Laboratory experiments indicate that the quality of product produced on small scale by powdering in a blender using dry ice is quite satisfactory. Such powdering is accomplished by first heating a mixture of the selected ingredients until a molten or liquified mass is formed, and then rapidly stirring until the mass is homogenized. For example, 100 grams of molten mixture in a 250 ml. beaker may be stirred until the mixture is found to be homogeneous. The mixture may then be poured out and cooled until solidified, typically for about 3–4 hours at room temperature. The solid may then be powdered in a high speed stirring device such as a Waring Blendor using dry ice. The dry ice is subsequently evaporated and the powder residue sieved to an approximate size of 50–300 microns.

The total monoglycerides concentration in the alimentary pasta or potato product of this invention is in a range from about 0.3 to about 2 percent by weight of the flour content (considered in the as-obtained or as-added condition). A concentration less than about 0.3 weight percent is possible but the effect of the monoglycerides is insignificant. A concentration greater than about 2 weight percent is also possible but not practical due to the increased difficulty in extruding the resulting alimentary pasta and the fact that the increase in effect on the end product over the effect at about the 2 weight percent level is not of sufficient magnitude to justify from a practical point of view the increase in concentration. Usually the concentration is in a range from about 0.5 to about 2 percent by weight of the flour content.

The products of this invention are prepared by contacting the flour or potato component with the monoglyceride composition at any stage following the formation of the flour up to and including the point of formation of the alimentary pasta product. The monoglyceride composition can be added as a dry powder to the flour or potato or at the blender before the kneading operation.

The following examples are submitted for a better understanding of the invention.

A direct relationship exists between the viscosity of the pasta or potato product and its condition of stickiness pastiness or sliminess. That is, the higher the viscosity, the less desirable the product with respect to these conditions, and vice versa. In the following examples, a fine, white powder corn starch is used. All runs are made with a concentration of 40 grams of starch per 450 grams of water and 2% or less (based on weight of starch) of the complexing agent.

Beginning at 30° C., the mixture is heated at the rate of 1.5° C. per minute to 92.5° C. Mixtures are held at 67° C. for 10 minutes during the cooking cycle.

Each sample mixture is held at 92.5° C. for 15 minutes.

After the 15 minute hold cycle at 92.5° C., the samples are cooled to 30° C. at a rate of 0.5° C., per minute.

Viscosity readings are recorded at the peak temperature and at the end of the cooling cycle to provide the data for Table I. The viscosity is given in Brabender Units (B.U.), a conventional viscosity measurement. Preferably, the viscosity does not increase significantly upon cooling. In the examples, a comparison of the viscosities at 92.5° C. and at 30° C. is made to determine effectiveness. While the fully hydrogenated compositions of Examples 2, 3, 9 and 16 indicate good viscosity results, dispersion of the monoglyceride in the paste or potato product is poor as evidenced by the presence of streaks as indicated by physical examination.

Viscosity measurements are made using a VISCO/Amylo/GRAPH, a product of the C. W. Brabender Instruments Inc., South Hackensack, N.J. This instrument measures and records apparent viscosity at fixed or constant varying temperatures. Viscosity determination is made by means of a suspended sensing element immersed in the material under test. The instrument is commonly used for gelation studies.

TABLE I

| Example | Additive | % | Temp., °C. | Time | B.U. at 92.5° C. | B.U. at 30° C. | Iodine Value | Melting Point °C. | Wettability Value (Angle in Degrees) |
|---|---|---|---|---|---|---|---|---|---|
| 1 (Control) | none | — | 67 | 10 | 600 | 1480 | | | |
| 2 (Control) | monoglyceride powder prepared from blend of fully hydrogenated soybean and cottonseed oils | 2 | 67 | 10 | 300 | 380 | 2 | 70 | 87 |
| 3 (Control) | monoglyceride powder prepared from fully hydrogenated palm oil | 2 | 67 | 10 | 480 | 680 | 2 | 69 | 87 |
| 4 | monoglyceride powder prepared from fully hydrogenated palm oil and monoglyceride prepared from refined palm oil in a 9:1 ratio | 2 | 67 | 10 | 500 | 920 | 5.8 | Apx. 65 | Apx. 80 |
| 5 | monoglyceride powder prepared from fully hydrogenated palm oil and monoglyceride prepared from refined palm oil in a 1:1 ratio | 2 | 67 | 10 | 600 | 1340 | 21 | 65 | 30 |
| 6 | monoglyceride powder prepared from fully hydrogenated soybean oil and partially hydrogenated soybean oil in a 9:1 ratio | 2 | 67 | 10 | 270 | 310 | 7.8 | 74 | 91 |
| 7 | monoglyceride powder prepared from fully hydrogenated soybean oil and partially hydrogenated soybean oil in a 8:2 ratio | 2 | 67 | 10 | 410 | 460 | 11.6 | Apx. 72 | Apx. 70 |
| 8 | monoglyceride powder prepared from fully hydrogenated soybean oil and partially hydrogenated soybean oil in a 8.5:1.5 ratio | 2 | 67 | 10 | 480 | 510 | 9.2 | 73.5 | 81 |
| 9 (Control) | monoglyceride powder prepared from fully hydrogenated cottonseed oil | 2 | 67 | 10 | 400 | 430 | 2 | 68 | 87 |
| 10 | monoglyceride powder prepared from fully hydrogenated soybean oil and monoglyceride prepared from refined safflower oil in 9:1 ratio | 2 | 67 | 10 | 600 | 800 | 13.3 | Apx. 65 | Apx. 60 |
| 11 | monoglyceride powder prepared from fully hydrogenated soybean oil and monoglyceride prepared from refined cottonseed oil in 9:1 ratio | 2 | 67 | 10 | 350 | 380 | 10.8 | 67–67.5 | Apx. 60 |
| 12 | monoglyceride powder prepared from fully hydrogenated soy- | 1 | 67 | 10 | 600 | 1100 | 10.8 | 67–67.5 | Apx. 60 |

TABLE I-continued

| Example | Additive | % | Temp., °C. | Time | B.U. at 92.5° C. | B.U. at 30° C. | Iodine Value | Melting Point °C. | Wettability Value (Angle in Degrees) |
|---|---|---|---|---|---|---|---|---|---|
| | bean oil and monoglyceride prepared from refined cottonseed oil in 9:1 ratio | | | | | | | | |
| 13 (Control) | none | — | 67 | 10 | 540 | 1150 | | | |
| 14 | monoglyceride powder prepared from fully hydrogenated soybean oil and monoglyceride prepared from refined cottonseed oil in 9:1 ratio | 2 | 65 | 10 | 360 | 370 | 10.8 | 67–67.5 | Apx. 60 |
| | monoglyceride powder prepared from fully hydrogenated soybean oil and monoglyceride prepared from refined cottonseed oil in 9:1 ratio | 2 | 65 | 15 | 440 | 480 | 10.8 | 67–67.5 | Apx. 60 |
| 16 (Control) | monoglyceride powder prepared from blend of fully hydrogenated soybean and cottonseed oils | 2 | 67 | 10 | 420 | 480 | 2 | 70 | 87 |

EXAMPLE 17

Fifteen lbs. of monoglyceride powder prepared from fully hydrogenated palm oil and monoglyceride prepared from refined palm oil in a 1:1 ratio, having an iodine value of 21, melting point of 65° C. and wettability value of 30 is mixed with 1000 lbs. flour and dry mixed for 5 minutes. It is transferred to an extruder and mixed with water to a moisture content of about 28%, making a stiff dough. The dough is extruded at about 2000 psi to form spaghetti and dried.

The spaghetti is overcooked (cooked 20 minutes in boiling water) and examined. Subjective tests indicate an absence of stickiness, absence of surface starch, very little water absorption, and in general, excellent eating characteristics. This product was then compared with spaghetti to which no starch complexing agent had been added and also cooked 20 minutes, and the subjective tests mentioned above indicated a very significant advantage with use of the monoglyceride starch complexing agent.

The monoglyceride powder used in Example 5 above has a high B.U. value because gelling of the powder occurred before it had time to complex the starch due to insufficient agitation during this particular test. However, in the following test, the same monoglyceride powder, as in Example 5, produces excellent results. Also, monoglyceride powder prepared from fully hydrogenated soybean oil and monoglyceride prepared from refined (partially hydrogenated) soybean oil in a 1:1 ratio produces excellent results.

When this test is repeated using Myvaplex 600 fully hydrogenated vegetable oil monoglyceride, results were inferior, measured subjectively, to those obtained using the monoglyceride prepared from a 1:1 ratio of saturated vegetable oil to refined vegetable oil of this example.

The iodine values specified herein are measured in accordance with AOCS Official Method Cd 1-25 (rev. April 1956), Official and Tentative Methods of the American Oil Chemists Society, 2nd ed., additions and revisions 1947 through 1963, inclusive.

Melting points herein are determined in accordance with AOCS Official Method Melting Point Capillary Tube Method Cc 1-25.

Wettability values specified herein are angles designated in degrees, measured by a Kernco Contact Angle Meter. This test is conducted as follows. Sampls to be tested are cast in a 1 inch diameter, cylindrical hole in a metal plate. The molten test material is supported from the bottom by a solid plate. The test material is sandwiched by placing a third metal plate on top. All three plates are 1/16 inch thick, and have smooth, unfinished flat surfaces. This procedure provides similar matte surfaces for the samples. The samples are allowed to solidify, and while at room temperature, a drop of water is placed on each sample. After two minutes, the drop is substantially stable. Viewing the drop on the sample in elevation, a tangent to the edge of the drop where it meets the surface of the sample is formed by one of the crosshairs in the contact angle measuring device. The angle of this line relative to the line formed by the base of the drop (i.e., the angle of contact) is measured; wettability is inversely proportional to the numerical value of the angle. For example, if the sample is very wettable, the drop spreads and the angle is small. On samples having extremely poor wettability, this angle may be more than 90°. The angle is related to the surface tension of the sample, the surface tension of the water (or other liquid) and the surface tension of the solid-liquid interface according to the following formula:

$$1 + \cos A = (B - C)/D$$

where A is the angle measured, B is the surface tension of the solid, C is the surface tension of the solid-liquid interface and D is the surface tension of the liquid. Wettability values specified herein are averages of six measurements.

While we do not wish to be bound in theory as to the principal of operation, we believe the unsaturated portion of the powder attracts water to the surface of the particles and subsequently forms micro gels. Thus, dry, free-flowing powder according to this invention is dispersible in water and bakery dough. For example, Myverol 18-07 disclosed in the aforesaid U.S. Pat. No. 3,113,869, a saturated monoglyceride sold by Eastman Chemical Products Incorporated having an iodine value of about 2 (maximum of about 5) is powderable, but its wettability is above 80 causing poor dispersibility.

Unless otherwise specified, all percentages, ratios, parts, etc., are by weight.

By the term solid solution, we mean a homogeneous crystalline material containing two or more substances in variable proportion.

The invention has been described in detail with particular reference to certain preferred embodiments thereof, but it will be understood that variations and modifications can be effected within the spirit and scope of the invention.

We claim:

1. A water dispersible powder adapted for use as a starch complexing agent in pasta and potato product, the particles of which consist essentially of, (a) from about 85 to about 95% of at least one saturated monoester of the formula

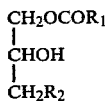

wherein $R_1$ is the residue of a vegetable oil even numbered straight chain saturated fatty acid having from 8 to 22 carbon atoms and $R_2$ is OH or H, and (b) from about 15% to about 5% of at least one saturated monoester of the formula

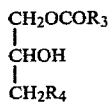

wherein $R_3$ is the residue of a vegetable oil even numbered straight chain unsaturated fatty acid having from 8 to 22 carbon atoms and $R_4$ is OH or H, the percentages of which are based on the total monoglyceride content of the powder.

2. A water dispersible powder according to claim 1 wherein the saturated monoglyceride is present in an amount of between about 89% and about 91% and the unsaturated monoglyceride is present in an amount of between about 11% and about 9%, the percentages being based on total monoglyceride content of the powder.

3. A water dispersible powder according to claim 1 wherein the saturated monoglyceride is prepared from saturated soybean oil and the unsaturated monoglyceride is prepared from unsaturated cottonseed oil.

4. A product selected from alimentary pasta and potatoes comprising from about 0.3% to about 2% by weight of the composition of claim 1.

5. A product selected from alimentary pasta and potatoes comprising from about 0.3 to about 2% by weight of the composition of claim 2.

6. A product selected from alimentary pasta and potatoes comprising from about 0.3% to about 2% by weight of the composition of claim 3.

7. The method of preparing a water dispersible powder of saturated and unsaturated monoglycerides useful as an additive in pasta and potato products which comprises melt blending from about 85% to about 95% of a saturated monoglyceride with from about 15% to about 5% of an unsaturated monoglyceride, and subsequently powdering the blend.

8. The method of preparing a water dispersible powder consisting essentially of saturated and unsaturated monoglycerides useful as an additive in pasta and potato products which comprises simultaneously esterifying a mixture of from about 85% to about 95% of saturated vegetable oils and from about 15% to about 5% of unsaturated vegetable oils, and subsequently forming a powder therefrom.

9. In the process for preparing an alimentary pasta product wherein water and alimentary pasta flour are admixed to form a pasta, the improvement which comprises incorporating into the alimentary pasta from about 0.3 to about 2%, based on the weight of flour, of a powder consisting essentially of from about 25% to about 95% of a saturated monoglyceride and from about 75% to about 5% of an unsaturated monoglyceride into the product.

10. A water dispersible powder according to claim 1 characterized in that said powder is in the form of a free flowing homogeneous powder has a melting point of about 50° C. or more, an iodine value of about 5 to about 20 and is wettable in water at 25° C. under mild agitation to form a particulate dispersion.

11. A powder according to claim 10 having a wettability value of from 0 to about 80.

12. A powder according to claim 10 wherein the acid residues of said monoesters are from natural oils or fats.

13. An alimentary pasta product comprising from about 0.3% to about 2% by weight of the composition of claim 10.

14. The method of preparing a water dispersible powder consisting essentially of saturated and unsaturated monoglycerides useful as an additive in pasta and potato products which comprises simultaneously esterifying a mixture of from about 85% to about 95% of naturally saturated vegetable oils and from about 15% to about 5% of naturally unsaturated vegetable oils, and subsequently forming a powder therefrom.

15. In the process for preparing an alimentary pasta product wherein water and alimentary pasta flour are admixed to form a pasta, the improvement which comprises incorporating into the alimentary pasta from about 0.3 to about 2%, based on the weight of flour, of a powder according to claim 1.

16. In the process for preparing an alimentary pasta product wherein water and alimentary pasta flour are admixed to form a pasta, the improvement which comprises incorporating into the alimentary pasta from about 0.3 to about 2%, based on the weight of flow or potato, of a free-flowing homogeneous monoglyceride powder having a melting point of about 50° C. or more, and iodine value of from about 5 to about 35, and a wettability of from 0 to about 80.

* * * * *

UNITED STATES PATENT AND TRADEMARK OFFICE
CERTIFICATE OF CORRECTION

PATENT NO. : 4,229,488
DATED : Oct. 21, 1980
INVENTOR(S) : James L. Suggs; Dan F. Buck It is certified that error appears in the above–identified patent and that said Letters Patent are hereby corrected as shown below:

Column 9, lines 25-26, "saturated" should read ---unsaturated--- .

Signed and Sealed this

Third Day of March 1981

[SEAL]

Attest:

RENE D. TEGTMEYER

Attesting Officer

Acting Commissioner of Patents and Trademarks